US 11,240,888 B2

(12) United States Patent
Wen (10) Patent No.: US 11,240,888 B2
(45) Date of Patent: Feb. 1, 2022

(54) TIMER BASED PROTECTION CIRCUIT AND LIGHTING DEVICE

(71) Applicant: OPPLE LIGHTING CO., LTD., Shanghai (CN)

(72) Inventor: Wei Wen, Shanghai (CN)

(73) Assignee: Opple Lighting Co., Ltd., Shanghai (CN)

(*) Notice: Subject to any disclaimer, the term of this patent is extended or adjusted under 35 U.S.C. 154(b) by 277 days.

(21) Appl. No.: 16/266,011

(22) Filed: Feb. 2, 2019

(65) Prior Publication Data

US 2019/0173273 A1 Jun. 6, 2019

Related U.S. Application Data

(63) Continuation of application No. PCT/CN2017/095674, filed on Aug. 2, 2017.

(30) Foreign Application Priority Data

Aug. 2, 2016 (CN) .................... 201620828361.X (51) Int. Cl.
*H02H 3/20* (2006.01)
*H05B 45/50* (2020.01)
(Continued)

(52) U.S. Cl.
CPC ........... *H05B 45/00* (2020.01); *H02H 1/0007* (2013.01); *H02H 3/20* (2013.01); *H05B 45/50* (2020.01); *Y02B 20/30* (2013.01)

(58) Field of Classification Search
CPC ......... H02H 3/20; H02H 1/0007; H05B 45/50
See application file for complete search history.

(56) References Cited

U.S. PATENT DOCUMENTS 4,395,672 A * 7/1983 Gassaway ............... H02J 7/008
320/158
5,914,865 A * 6/1999 Barbehenn ............. H02M 1/40
323/902

(Continued)

FOREIGN PATENT DOCUMENTS

CN       201674074 U    12/2010
CN       202111650 U    1/2012
(Continued)

OTHER PUBLICATIONS

International Search Report (including English translation) and Written Opinion issued in PCT/CN2017/095674, dated Nov. 3, 2017, 10 pages.

*Primary Examiner* — Scott Bauer
(74) *Attorney, Agent, or Firm* — Arch & Lake LLP (57) ABSTRACT

The present disclosure provides a timer based protection circuit and a lighting device. The protection circuit is configured to acquire a working current or an output voltage of a protected object, and compare a voltage value converted from a current value of the working current or a voltage value of the acquired output voltage with a predetermined threshold. When the voltage value converted from the current value of the working current or the voltage value of the acquired output voltage is greater than or equal to the predetermined threshold, the protection circuit resets the timer to cause the timer to output a low voltage level; and when the voltage value converted from the current value of the working current or the voltage value of the acquired output voltage is less than the predetermined threshold, the timer works normally.

17 Claims, 4 Drawing Sheets

(51) Int. Cl.
*H05B 45/00* (2020.01)
*H02H 1/00* (2006.01)

(56) References Cited

U.S. PATENT DOCUMENTS

| | | | |
|---|---|---|---|
| 2007/0165429 A1 | 7/2007 | Palanivel | |
| 2012/0299500 A1* | 11/2012 | Sadwick | H05B 45/385 315/224 |
| 2014/0043036 A1* | 2/2014 | Zhuang | H02H 9/046 324/537 |

FOREIGN PATENT DOCUMENTS

| | | |
|---|---|---|
| CN | 203219558 U | 9/2013 |
| CN | 105262055 A | 1/2016 |
| CN | 105403791 A | 3/2016 |
| CN | 206061208 U | 3/2017 |

* cited by examiner

TIMER BASED PROTECTION CIRCUIT AND LIGHTING DEVICE

CROSS-REFERENCE TO RELATED APPLICATIONS

This application is based upon and claims the priority of PCT patent application No. PCT/CN2017/095674 filed on Aug. 2, 2017 which claims the priority of Chinese Patent Application No. 201620828361.X filed on Aug. 2, 2016, the entire content of all of which is hereby incorporated by reference herein for all purposes.

TECHNICAL FIELD

The present disclosure relates to the field of circuit protection, and in particular to a timer based protection circuit and a lighting device.

BACKGROUND

The 555 timer chip is an integrated circuit. The 555 timer chip can be used not only as a timer and a waveform generator but also as a control chip for a power topology loop, and is widely used in the fields of switching power supplies, lighting electronics and the like due to its advantages of inexpensive price and various applications.

SUMMARY

The present disclosure provides a timer based protection circuit, a lighting device and a method of utilizing a timer based protection circuit.

According to one aspect of the present disclosure, a timer based protection circuit is provided. The timer based protection circuit may be configured to: acquire a working current or an output voltage of a protected object; and compare a voltage value converted from a current value of the working current or a voltage value of the acquired output voltage with a predetermined threshold, where, when the voltage value converted from the current value of the working current or the voltage value of the acquired output voltage is greater than or equal to the predetermined threshold, the protection circuit resets the timer to cause the timer to output a low voltage level, and when the voltage value converted from the current value of the working current or the voltage value of the acquired output voltage is less than the predetermined threshold, the timer works normally.

According to another aspect of the present disclosure, a lighting device is provided. The lighting device may include a load and a timer based protection circuit, and timer based protection circuit may be configured to acquire a working current or an output voltage of a protected object; and compare a voltage value converted from a current value of the working current or a voltage value of the acquired output voltage with a predetermined threshold, where, when the voltage value converted from the current value of the working current or the voltage value of the acquired output voltage is greater than or equal to the predetermined threshold, the protection circuit resets the timer to cause the timer to output a low voltage level, and when the voltage value converted from the current value of the working current or the voltage value of the acquired output voltage is less than the predetermined threshold, the timer works normally.

According to a third aspect of the present disclosure, a method of utilizing a timer based protection circuit is provided. The method may include acquiring a working current or an output voltage of a protected object; comparing a voltage value converted from a current value of the working current or a voltage value of the acquired output voltage with a predetermined threshold; and when the voltage value converted from the current value of the working current or the voltage value of the acquired output voltage is greater than or equal to the predetermined threshold, resetting, by the protection circuit, the timer to cause the timer to output a low voltage level; and when the voltage value converted from the current value of the working current or the voltage value of the acquired output voltage is less than the predetermined threshold, keeping the timer to work normally.

It is to be understood that both the foregoing general description and the following detailed description are exemplary and explanatory only and are not restrictive of the present disclosure.

BRIEF DESCRIPTION OF THE DRAWINGS

Various other advantages and benefits will become well understandable to those of ordinary skill in the art by reading the following detailed description of the examples. The drawings are only for purposes of illustrating examples and are not to be construed as limiting the present disclosure. Also throughout the drawings, the same reference numerals refer to the same parts. In the drawing.

DETAILED DESCRIPTION

Examples of the present disclosure will be described below in more detail with reference to the accompanying drawings. Although the drawings illustrate examples of the present disclosure, it should be understood that the present disclosure may be implemented in various forms and should not be limited by the examples set forth herein. In addition, these examples are provided so that this disclosure will be better understood, and will fully convey the scope of the disclosure to those skilled in the art.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
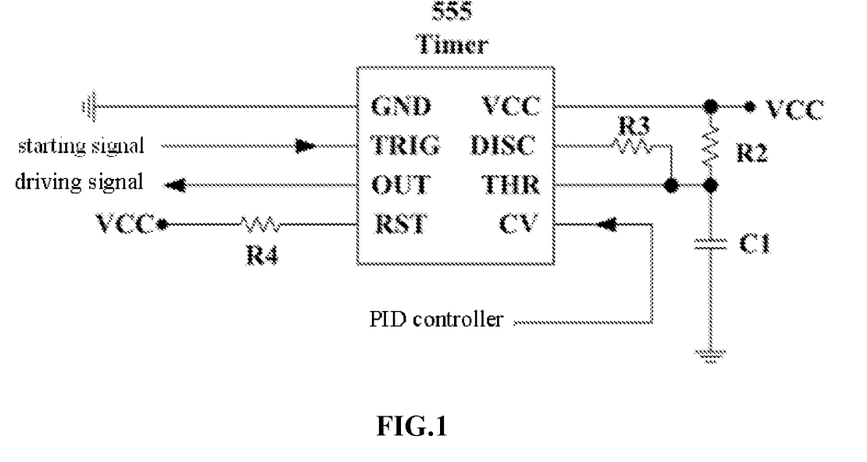
FIG. 1 is a structural diagram of a voltage mode control circuit based on a 555 timer.

FIG. 1 illustrates a voltage mode control circuit based on a 555 timer in which the 555 timer chip acts as a control chip of a power topology loop. The functions of the pins of the 555 timer are as follows.

A pin VCC and a pin GND are a power supply pin and a grounding pin of the chip, respectively, and the pin VCC of the chip is connected to an external power supply.

A pin TRIG is a trigger pin of the chip. When the pin TRIG is input with a low voltage level, a pin OUT would output a high voltage level. The pin TRIG can be used as a starting signal of an external power switch. When the external power switch needs to be switched on upon zero-crossing, a zero-crossing detection signal may be connected to the TRIG pin. When the external power switch needs to be driven by using a fixed frequency, a clock signal may be connected to the pin TRIG.

The pin OUT may be directly connected to the external power switch. In this case, a driving signal output by the pin OUT drives the external power switch. The external power switch may be a triode, a field effect transistor, or an insulated gate bipolar transistor (IGBT), a relay or other electronic switch.

A pin RST is a reset pin of the chip and has the highest priority. In general, when the pin RST is input with a low voltage level, the pin OUT outputs a low voltage level, and the chip does not work; when the pin RST is input with a high voltage level, the pin OUT outputs a high voltage level, and other pins of the chip can work normally.

A pin DISC is a discharge pin. A switch is arranged inside the chip, and is configured to control a signal of the pin DISC to be logically opposite to an output voltage of the pin OUT. When the pin OUT outputs a high voltage level, the switch inside the chip is turned off, and the pin DISC appears as a high resistance state. When the pin OUT outputs a low voltage level, the switch inside the chip is switched on, and the pin DISC is shorted and connected to a grounding terminal of the chip.

A pin THR is a threshold pin. The pin THR shares the same internal comparator of the chip with a pin CV, and is connected to a negative terminal of the comparator of the chip (not illustrated in FIG. 1). When a voltage of the pin THR is higher than that of the pin CV, the pin OUT outputs a low voltage level.

The pin CV is a voltage control pin of the chip, and is used in conjunction with the pin THR. The pin CV is connected to a positive terminal of the internal comparator of the chip. The pin CV is configured to determine a comparison threshold which allows the pin OUT to output a low voltage level.

Still referring to FIG. 1, the pin RST is connected to the external power supply VCC through a fourth resistor R4. The pin CV is connected to an output terminal of a PID controller. An object of the PID controller may be an output voltage, an output current or other variables. The output terminal of the PID controller is connected to the pin CV of the 555 timer chip. An output value of the PID controller is used as a control threshold for turning off the external power switch. The pin VCC is connected to the pin THR through a second resistor R2, a capacitor C1 is arranged between the pin THR and the grounding terminal, and a third resistor R3 is arranged between the pin THR and the pin DISC.

With reference to the function of each pin of the 555 timer as described above and FIG. 1, a working principle of the voltage mode control circuit based on the 555 timer is described as follows.

When the 555 timer chip is powered on, a starting signal of the external power switch (i.e., a controlled object) is connected to the trigger pin TRIG of the chip, which is generally active at a low voltage level. That is, the pin TRIG is input with a low voltage level, the pin OUT outputs a high voltage level. At this time, the internal switch of the pin DISC is turned off, the external power supply VCC charges the capacitor C1 through the second resistor R2, and the charging parameters of the capacitor C1 in the charging process are only related to the second resistor R2 and the capacitor C1. When a voltage on the capacitor C1 (a voltage on the pin THR) is greater than an output voltage of the PID controller (a voltage on the pin CV), the pin OUT outputs a low voltage level, the internal switch of the pin DISC is turned on (at this time, the pin DISC is shorted and connected to the grounding terminal of the chip), and the voltage on the capacitor C1 is discharged to the grounding terminal through the third resistor R3. Finally, a stable voltage of the capacitor C1 is a voltage on the capacitor C1 which is obtained after a voltage division of the external power supply VCC by the second resistor R2 and the third resistor R3. When the output pin OUT outputs a high voltage level, except for the first cycle of the output signal of the pin OUT, the voltage on the capacitor C1 is always charged from a fixed voltage (i.e., the stable voltage of the capacitor C1), and the pin OUT outputs a low voltage level upon the voltage on the capacitor C1 reaching a voltage threshold set by the pin CV; therefore, by controlling the output of the PID (proportion integration differentiation) controller, it is convenient to adjust a duty ratio of output pulse width of the pin OUT, so as to achieve the purpose of circuit regulation.

However, the voltage mode control circuit established based on the 555 timer fails to provide a cyclical peak protection for a current flowing through the external power switch. When the system is started or an input/output is dynamically switched, due to the limitation of closed-loop bandwidth, the adjustment of the duty ratio of output pulse width of the pin OUT is relatively slow, and an excessively great current peak would often flow through the external power switch. Normally, a current flowing through the external power switch will also flow through a power inductor or a power transformer. If the current is too large, a magnetic core of the power inductor or the power transformer will be saturated, resulting in a decrease in the inductance of the power inductor or the power transformer and a further increase of the current, which not only increases the loss of the external power switch and generates noise, but also affects the stability and reliability of the system. Therefore, it is necessary to add a current peak protection circuit to the voltage mode control circuit established based on the 555 timer so as to provide a cyclical current protection for the external power switch.

Figure 2:
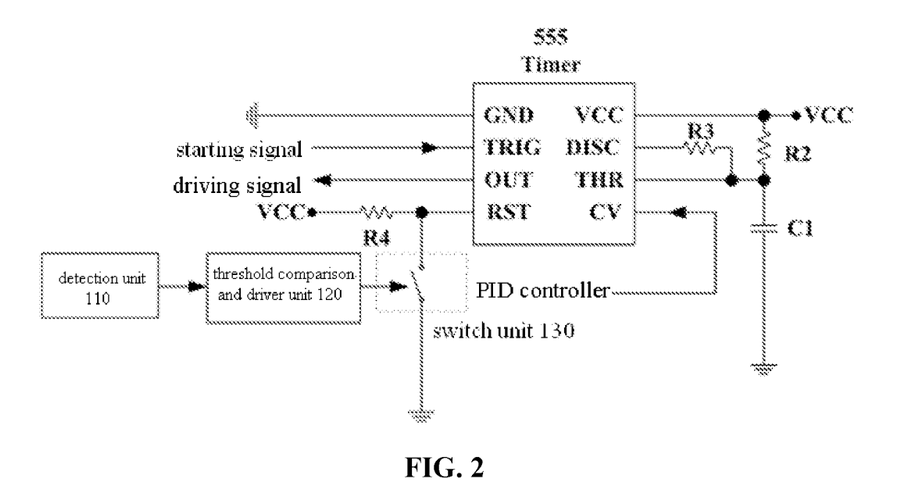
FIG. 2 is a block diagram illustrating a structure of a protection circuit according to an example of the present disclosure.

In order to solve the above technical problems, an example of the present disclosure provides a timer based protection circuit, which can be used to provide a current protection for a working current of an external power switch or a load, and can also provide a voltage protection for an output voltage of the load. Referring to FIG. 2, the timer based protection circuit acquires a working current or an output voltage of a protected object (not illustrated in FIG. 2). If the working current of the protected object is acquired, the current value of the working current is converted into a voltage value. The voltage value converted from the current value or the voltage value of the acquired output voltage is compared with a predetermined threshold. When the voltage value converted from the current value or the voltage value of the acquired output voltage is greater than or equal to the predetermined threshold, the protection circuit resets the timer to cause the timer to output a low voltage level. When the voltage value converted from the current value or the voltage value of the acquired output voltage is less than the predetermined threshold, the timer works normally. The timer in the present disclosure may be a 555 timer, the protected object may be a controlled object and/or a load, and the controlled object may also be an external power switch. Of course, the timer in the present disclosure may also be other types of timers, and the protected object may also be other types of protected objects, which are not specifically limited in the present disclosure.

Still referring to FIG. 2, in an example of the present disclosure, the protection circuit may include a detection unit 110, a threshold comparison and driver unit 120, and a switch unit 130. The detection unit 110 is connected to the protected object, and the detection unit 110 is configured to acquire the working current or the output voltage of the protected object. When the working current of the protected object is acquired, the current value of the working current is converted into a voltage value, and the voltage value converted from the current value or the voltage value of the acquired output voltage is fed back to the threshold comparison and driver unit 120. The threshold comparison and driver unit 120 is connected to the detection unit 110 and the switch unit 130, respectively, and the threshold comparison and driver unit 120 receives the voltage value which is converted from the current value and is fed back by the detection unit 110 or receives the voltage value of the acquired output voltage, compares the received voltage value converted from the current value or the received voltage value of the acquired output voltage with a predetermined threshold, and controls the switch unit 130 to be switched on or off according to a comparison result. The switch unit 130 controls the working state of the timer, the switch unit 130 is connected to the reset pin RST of the timer. When the switch unit 130 is switched on, the timer is reset; and when the switch unit 130 is switched off, the timer works normally.

Referring to FIG. 2 and the foregoing example, a working principle of the timer based protection circuit provided by the example of the present disclosure is described below. In this example, the timer adopts a 555 timer.

The detection unit 110 acquires a working current of a protected object of the 555 timer. The detection unit 110 acquires a working current or an output voltage of the protected object. When the working current of the protected object is acquired, a current value of the working current is converted into a voltage value, and the voltage value converted from the current value or a voltage value of the acquired output voltage is fed back to the threshold comparison and driver unit 120; the threshold comparison and driver unit 120 compares the received voltage value converted from the current value or the received voltage value of the acquired output voltage with a predetermined threshold. If the voltage value converted from the current value or the voltage value of the acquired output voltage is lower than the predetermined threshold, the switch unit 130 is in an off state, the reset pin RST of the 555 timer is connected to an external power supply VCC, and the pin RST is input with a high voltage level, the 555 timer is in a normal working state. If the voltage value converted from the current value or the voltage value of the acquired output voltage is higher than the predetermined threshold, the threshold comparison and driver unit 120 controls the switch unit 130 to be in an on state; at this time, the reset pin RST of the 555 timer is shorted to the grounding terminal, and the pin RST is input with a low voltage level, then the output pin OUT is at a low voltage level according to an internal logic of the 555 timer chip, the protected object does not work anymore, and neither working current nor output voltage is generated. If the protected object is an external power switch, then the external power switch is switched off.

If the switch unit 130 is in an off state and the pin RST returns to a high voltage level before a next starting signal arrives, when the next starting signal (such as a low level signal) is coming, the output pin OUT of the 555 timer chip normally outputs a driving signal (such as a high level signal) to drive the protected object to work normally. If the switch unit 130 is always in an on state, then the reset pin RST is always input with a low voltage level and other pins of the 555 timer chip cannot work properly; therefore, the pin OUT outputs a low voltage level, and the protected object connected to the pin OUT cannot work properly at this time.

It can be seen that, by adding the detection unit 110, the threshold comparison and driver unit 120 and the switch unit 130 into the 555 timer based voltage mode control circuit, a current peak protection can be effectively provided to the protected object, and the stability of the system can be improved.

Figure 3:
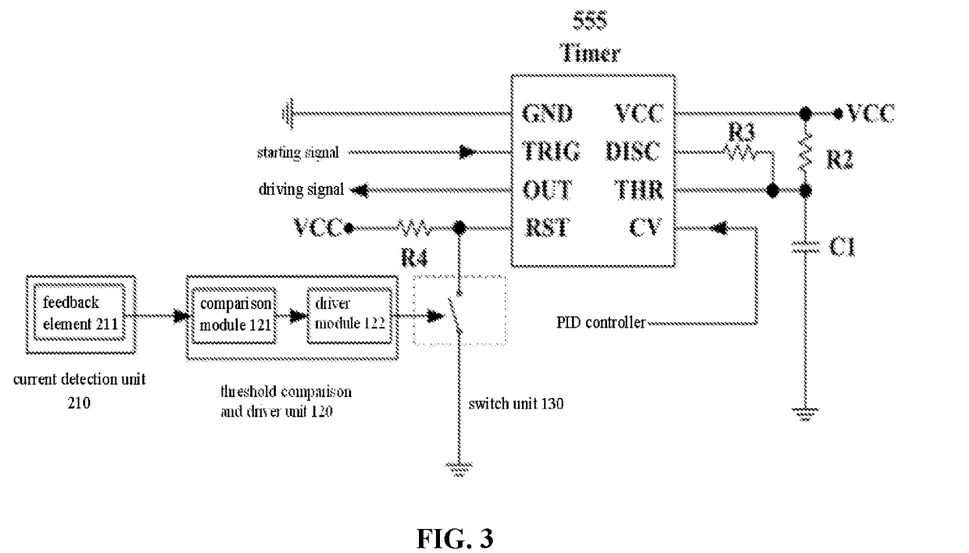
FIG. 3 is a block diagram illustrating a structure of a protection circuit according to another example of the present disclosure.

In an example of the present disclosure, referring to FIG. 2 and FIG. 3, when the timer based protection circuit acquires a working current of a protected object and the detection unit 110 is a current detection unit 210, the current detection unit 210 is connected to the protected object (not illustrated in FIG. 2 and FIG. 3). The current detection unit 210 acquires a working current of the protected object, converts the current value of the acquired working current into a voltage value, and feeds the voltage value converted from the current value back to the threshold comparison and driver unit 120. The threshold comparison and driver unit 120 is connected to the current detection unit 210 and the switch unit 130, respectively; the threshold comparison and driver unit 120 receives the voltage value which is converted from the current value and is fed back by the current detection unit 210, compares the received voltage value converted from the current value with a predetermined threshold, and controls the switch unit 130 to be switched on or off according to a comparison result. The current detection unit 210 may include a feedback element 211, and the feedback element 211 is connected to the protected object. The feedback element 211 is configured to acquire the working current of the protected object, convert the current value of the acquired working current into a voltage value, and feed the voltage value converted from the current value back to the threshold comparison and driver unit 120. In this example, the feedback element 211 may include a detection resistor, a transformer, a Hall sensor, and the like.

Still referring to FIG. 2 and FIG. 3, in this example, the threshold comparison and driver unit 120 includes a comparison module 121 and a driver module 122. The comparison module 121 is connected to the feedback element 211, and configured to receive the voltage value which is converted from the current value and is fed back by the feedback element 211, compare the received voltage value converted from the current value with a predetermined threshold, and output a comparison result. The driver module 122 is connected to the comparison module 121, and the driver module 122 is configured to transmit the comparison result output by the comparison module 121 to the switch unit 130, and control the switch unit 130 to be switched on or off.

Figure 4:
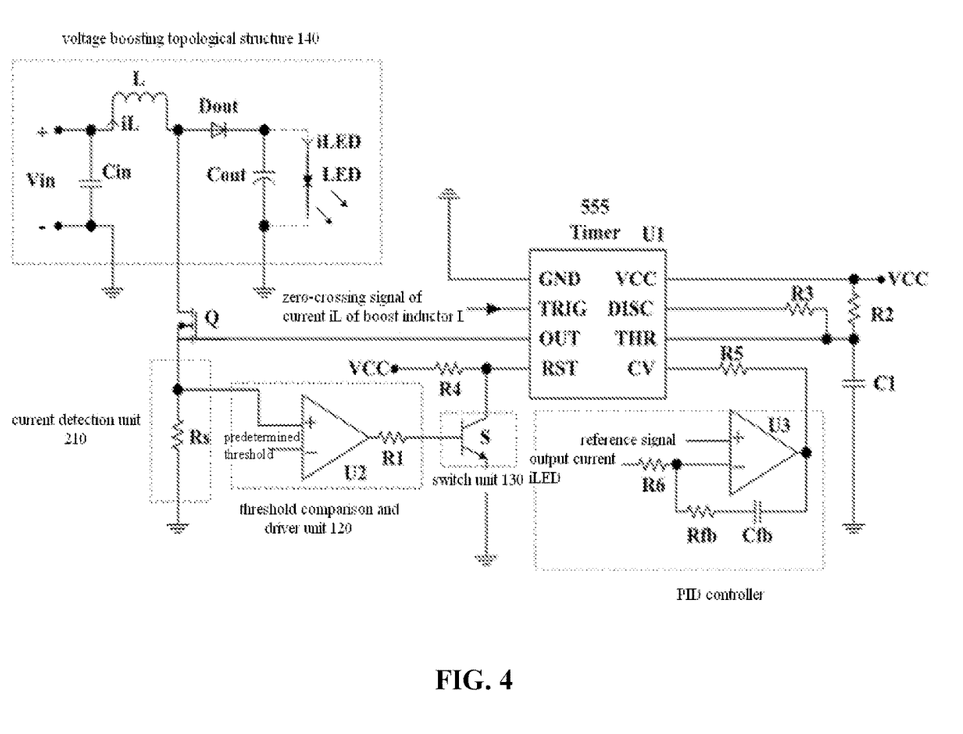
FIG. 4 is a structural diagram of a protection circuit according to an example of the present disclosure.

Referring to FIG. 3 and FIG. 4, in order to more clearly illustrate the example of the present disclosure, the timer based protection circuit provided by the present disclosure is described in details with reference to the case where the protection current is adopted to acquire a working current of the protected object, the protected object is a controlled object, and the controlled object is an external power switch, by way of example.

In this example, the main power portion adopts a voltage boosting topological structure 140, and the controlled object is an external power switch Q, the external power switch Q is an IGBT, and the IGBT is a composite, fully-controlled, voltage driven power semiconductor device consisting of a bipolar junction transistor (BJT) and a metal oxide semiconductor (MOS, metal-insulator-semiconductor field effect transistor). In this example, the timer adopts a 555 timer chip, the feedback element 211 (illustrated in FIG. 3) of the current detection unit 210 is a detection resistor Rs, the comparison module 121 (illustrated in FIG. 3) of the threshold comparison and driver unit 120 is a comparator U2, the driver module 122 (illustrated in FIG. 3) is a first resistor R1, and the switch unit 130 is a triode S.

In this example, a main power portion includes an input voltage Vin, and a filter capacitor Cin connected between a positive electrode and a negative electrode of the input voltage Vin. Further, a boost inductor L is connected to the positive electrode of the input voltage Vin; an end of the boost inductor L that is not connected to the input voltage Vin is connected to a positive electrode of an output diode Dout; and an output filter capacitor Cout is arranged between the positive electrode of the output diode Dout and the grounding terminal. The output filter capacitor Cout is configured to filter a high frequency ripple output by the output diode Dout, and a load LED is connected to both ends of the filter capacitor Cout so as to be connected in parallel with the filter capacitor Cout.

A collector of the external power switch Q is connected to the positive electrode of the output diode Dout as described above.

A gate of the external power switch Q is connected to the pin OUT of the 555 timer chip, and the pin OUT of the 555 timer controls the working state of the external power switch Q. When the pin OUT outputs a high voltage level, the external power switch Q is switched on; when the pin OUT outputs a low voltage level, the external power switch Q is switched off.

An emitter of the external power switch Q is connected to the first detection resistor Rs in the current detection unit 210. The current detection unit 210 samples the working current of the external power switch Q by the first detection resistor Rs, converts the acquired current value into a voltage value and feeds the voltage value back to a positive terminal of the comparator U2 in the threshold comparison and driver unit 120. A negative terminal of the comparator U2 is input with a predetermined threshold to be compared with the voltage value input to the positive terminal of the comparator U2, and the comparison result is output through an output terminal of the comparator U2. The output terminal of the comparator U2 is connected to a base of the triode S through a first resistor R1, a collector of the triode S is connected to the reset pin RST of the 555 timer, and an emitter of the triode S is connected to the grounding terminal. The output of the comparator U2 controls the state of the triode S after passing through the first resistor R1, so that the reset of the 555 timer can be realized by the triode S.

Still referring to FIG. 4 and the example as described above, the working process of the protection circuit illustrated in FIG. 4 will be described as below.

A zero-crossing detection signal of a current iL of the boost inductor L is connected to the trigger pin TRIG of the 555 timer. When the current iL of the inductor crosses zero, the trigger pin TRIG is input with a low voltage level, and the output pin OUT of the 555 timer outputs a high voltage level, thereby triggering the external power switch Q to be switched on. The input voltage Vin is superimposed on the boost inductor L. Since the inductor L in the main power portion is a boost inductor, a current flowing through the boost inductor L rises linearly, which also causes a current flowing through the external power switch Q to rise linearly.

The current detection unit 210 converts the acquired current value of the external power switch Q into a voltage value by using the first detection resistor Rs, and feeds the voltage value back to the positive terminal of the comparator U2 in the threshold comparison and driver unit 120. If the voltage value fed back by the first detection resistor Rs is less than the predetermined threshold, the comparator U2 outputs a low voltage level, and the output low level signal is input to the base of the triode S through the first resistor R1. At this time, the triode S is switched off, the pin RST is connected to the external power supply VCC and is input with a high voltage level, the 555 timer chip works normally, and meanwhile the external power switch Q is in a normal working state. If the voltage value fed back by the first detection resistor Rs is greater than the predetermined threshold, the comparator U2 outputs a high voltage level, and when the high level signal is input to the base of the triode S through the first resistor R1, the triode S is switched on. The switched-on triode S controls the pin RST of the 555 timer to be connected to the grounding terminal, so that the pin RST is input with a low voltage level. According to the internal logic of the 555 timer, the output pin OUT outputs a low voltage level and controls the external power switch Q to be switched off, so as to avoid the current flowing through the external power switch Q to be further increased, and reduce the loss of the external power switch Q.

A voltage on the first detection resistor Rs in the current detection unit 210 is zero during an off period of the external power switch Q, so that an input terminal of the comparator U2 is input with a low voltage level, and the output terminal of the comparator U2 outputs a low voltage level. That is, the base of the triode S is input with a low voltage level, and the triode S is in an off state. At this time, the pin RST is reconnected to the external power supply, and the pin RST is input with a high voltage level. When the pin TRIG of the 555 timer chip is input with a zero-crossing detection signal of current iL next time, the 555 timer can work normally, and the external power switch Q can be in an on state.

If the external power switch Q is switched off, the current flowing through the boost inductor L does not flow to the external power switch Q anymore, but flows to the output terminal of the output diode Dout through the output diode Dout. At this time, the current flowing through the boost inductor L is linearly decreased. At this time, no current flows through the external power switch Q, the value of the current flowing through the load LED is decreased, and the voltage value of the load LED is decreased. The example of the present disclosure adopts a current iLED flowing through the load LED as an input signal of the PID controller, so as to ensure that the current iLED flowing through the load LED is constant.

Still referring to FIG. 4, in the example of the present disclosure, a resistor Rfb, a capacitor Cfb, a sixth resistor R6, and an operational amplifier U3 together constitute a PID controller. The sixth resistor R6 is configured to convert a current iLED flowing through the load LED into a voltage signal and feed the voltage signal back to a negative terminal of operational amplifier U3. A positive terminal of the operational amplifier U3 is connected to a reference signal, the voltage signal input to the negative terminal of the operational amplifier U3 is compared with the reference signal, and an output voltage of the operational amplifier U3 is obtained based on a comparison result. The output of the operational amplifier U3 is connected to the pin CV of the 555 timer through a fifth resistor R5, so as to control an on-time or on-duty ratio of the power switch Q. The PID controller is a technical solution and will not be described in detail herein.

Figure 5:
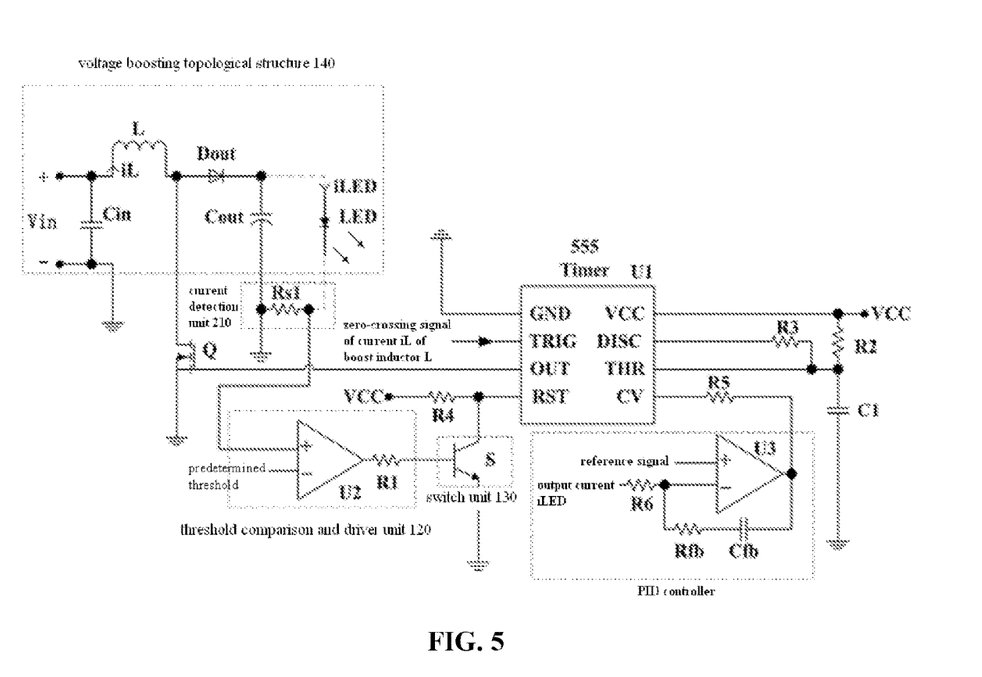
FIG. 5 is a structural diagram of a protection circuit according to another example of the present disclosure.

In another example of the present disclosure, referring to FIG. 3 and FIG. 5, the protection circuit of this example acquires a current of the protected object, and the protected object is a load. The difference between this example and the example illustrated in FIG. 4 lies only in that, the protected object of the timer based protection circuit is a LED load, and the feedback element 211 (illustrated in FIG. 3) is a second detection resistor Rs1.

In this example, one end of the LED load is connected to the second detection resistor Rs1 in the current detection unit 210, and the positive terminal of the comparator U2 is connected to the end of the second detection resistor Rs1 to which the load LED is connected. The current detection unit 210 adopts the second detection resistor Rs1 to sample the working current of the load LED, convert the acquired current value into a voltage value, and feed the voltage value converted from the acquired current value back to the positive terminal of the comparator U2 in the threshold comparison and driver unit 120.

Moreover, working principles of the voltage boosting topological structure 140, the threshold comparison and driver unit 120, the switch unit 130 and the 555 timer as well as connection relationships between these units illustrated in FIG. 5 are the same as the corresponding ones in the example illustrated in FIG. 4, repeated contents are omitted herein, and details may be referred to the above descriptions. Additionally, the PID controller is a technical solution and will not be described in detail herein.

Figure 6:
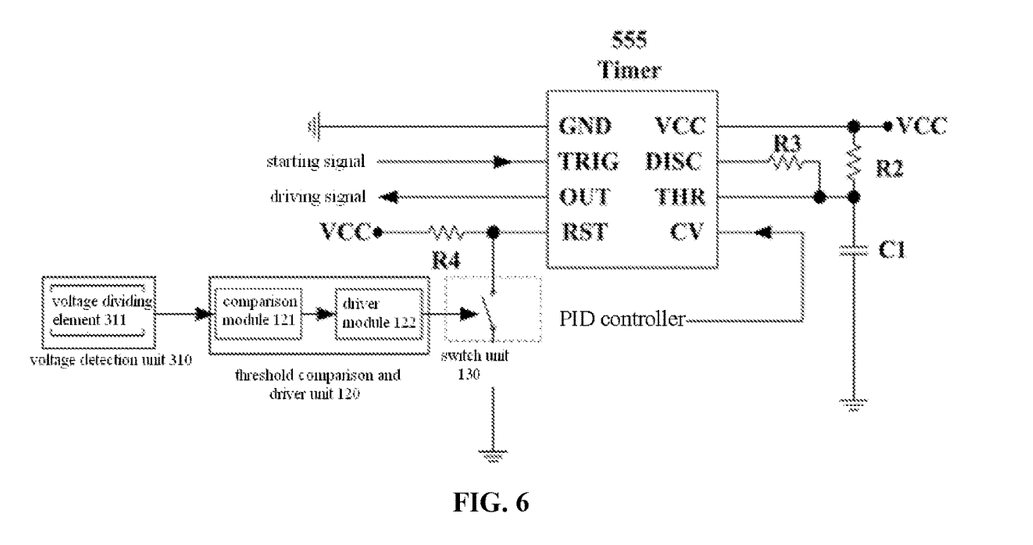
FIG. 6 is a block diagram illustrating a structure of a protection circuit according to still another example of the present disclosure.

In still another example of the present disclosure, when the protection circuit acquires a voltage of the protected object, referring to FIG. 2 and FIG. 6, the detection unit 110 is a voltage detection unit 310, and the voltage detection unit 310 is connected to the protected object (not illustrated in FIG. 2 and FIG. 6). The voltage detection unit 310 acquires an output voltage of the protected object, and feeds the voltage value of the acquired output voltage back to the threshold comparison and driver unit 120. The threshold comparison and driver unit 120 is connected to the voltage detection unit 310 and the switch unit 130, respectively; the threshold comparison and driver unit 120 receives the output voltage of the protected object fed back by the voltage detection unit 310, compares the received voltage value of the output voltage of the protected object with the predetermined threshold, and controls the switch unit 130 to be switched on or off according to a comparison result.

Referring to FIG. 6, in the example of the present disclosure, the voltage detection unit 310 may include a voltage dividing element 311, and the voltage dividing element 311 is connected to the protected object. The voltage dividing element 311 is configured to acquire an output voltage of the protected object, divide the acquired output voltage, and feed a voltage obtained by dividing the output voltage back to the threshold comparison and driver unit 120. The threshold comparison and driver unit 120 includes a comparison module 121 and a driver module 122. The comparison module 121 is connected to the voltage dividing element 311 and is configured to: receive a voltage value which is obtained by dividing the output voltage and is fed back by the voltage dividing element 311, compare the received voltage value obtained by dividing the output voltage with the predetermined threshold, and output a comparison result. The driver module 122 is connected to the comparison module 121, and is configured to transmit the comparison result output by the comparison module 121 to the switch unit 130 and control the switch unit 130 to be switched on or off.

Figure 7:
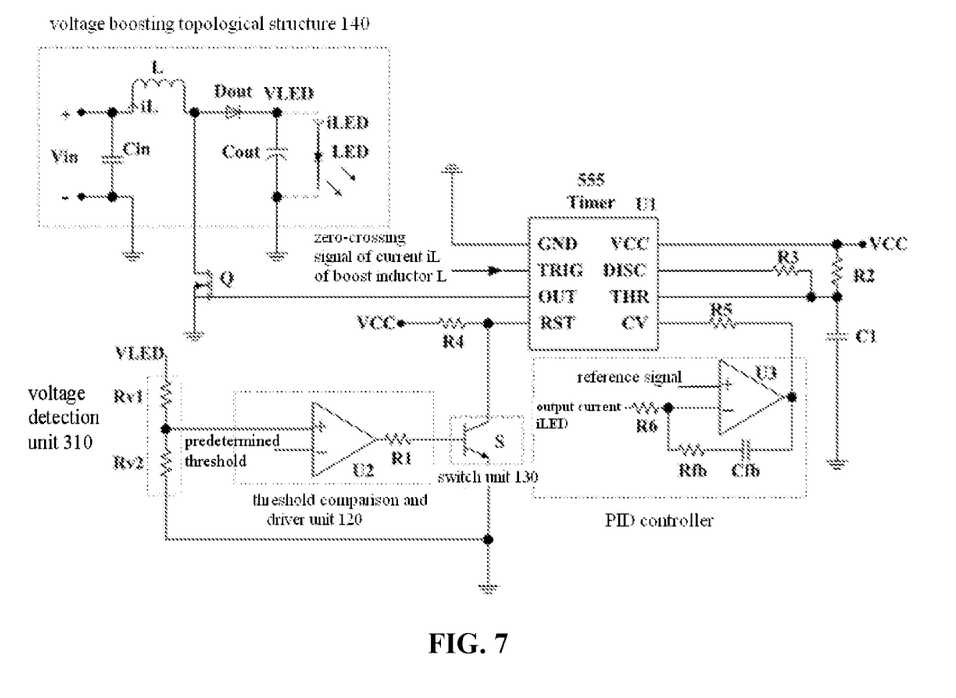
FIG. 7 is a structural diagram of a protection circuit according to yet another example of the present disclosure.

Referring to FIG. 6 and FIG. 7, in an example of the present disclosure, when the protection circuit acquires a voltage of the protected object, the protected object is a LED load. In this example, the main power portion adopts a voltage boosting topological structure 140, the timer adopts a 555 timer chip, the voltage dividing element 311 of the voltage detection unit 310 adopts a first voltage dividing resistor Rv1 and a second voltage dividing resistor Rv2, the threshold comparison and driver unit 120 includes a comparator U2 and a first resistor R1, and the switch unit 130 is a triode S.

A collector of the external power switch Q is connected to the positive electrode of the output diode Dout in the voltage boosting topological structure 140.

A gate of the external power switch Q is connected to the pin OUT of the 555 timer chip, and the pin OUT of the 555 timer controls the working state of the external power switch Q. When the pin OUT outputs a high voltage level, the external power switch Q is switched on; when the pin OUT outputs a low voltage level, the external power switch Q is switched off.

An emitter of the external power switch Q is connected to the grounding terminal.

In this example, one end of the first voltage dividing resistor Rv1 is connected to the LED load, the other end of the first voltage dividing resistor Rv1 is connected to the second voltage dividing resistor Rv2, and an end of the second voltage dividing resistor Rv2 that is not connected to the first voltage dividing resistor Rv1 is connected to the grounding terminal. The comparison module 121 includes a comparator U2. A positive terminal of the comparator U2 is connected to the end of the first voltage dividing resistor Rv1 which is connected to the second voltage dividing resistor Rv2 so as to receive the voltage value obtained by dividing the output voltage by the voltage dividing element 311. A negative terminal of the comparator U2 is input with a predetermined threshold to be compared with the voltage value obtained by dividing the output voltage. If the voltage value that is fed back to the positive terminal of the comparator U2 after a voltage division by the first voltage dividing resistor Rv1 and the second voltage dividing resistor Rv2 is less than the predetermined threshold, the comparator U2 outputs a low voltage level. The output low level signal is input to the base of the triode S through the first resistor R1, at this time, the triode S is switched off, the pin RST is connected to the external power source VCC and is input with a high voltage level, the 555 timer chip works normally, and meanwhile the external power switch Q is in a normal working condition. If the voltage value that is fed back to the positive terminal of the comparator U2 after a voltage division by the first voltage dividing resistor Rv1 and the second voltage dividing resistor Rv2 is greater than or equal to the predetermined threshold, the comparator U2 outputs a high voltage level. When the high level signal is input to the base of the triode S through the first resistor R1, the triode S is switched on, and the switched-on triode S controls the pin RST of the 555 timer to be connected to the grounding terminal so that the pin RST is input with a low voltage level, and the output pin OUT outputs a low voltage level and controls the external power switch Q to be switched off according to the internal logic of the 555 timer. At this time, the output voltage on the LED load does not increase anymore, which not only effectively avoids excessive output voltage on the LED load, but also avoids the current flowing through the external power switch Q to be further increased, thereby reducing the loss of the external power switch Q.

Moreover, working principles of the voltage boosting topological structure 140, the threshold comparison and driver unit 120, the switch unit 130 and the 555 timer as well as connection relationships between these units illustrated in FIG. 7 are the same as the corresponding ones in the examples illustrated in FIG. 4 and FIG. 5, repeated contents are omitted herein, and details may be referred to the above descriptions. Additionally, the PID controller is a technical solution and will not be described in detail herein.

The present disclosure also provides a lighting device including a load and a timer based protection circuit as mentioned above. The load includes a light-emitting element, and the protection circuit acquires a working current or an output voltage of the light-emitting element. When the working current of the light-emitting element is acquired, the current value of the working current of the light-emitting element is converted into a voltage value, and the voltage value converted from the current value or the voltage value of the acquired output voltage is compared with a predetermined threshold. When the voltage value converted from the current value or the voltage value of the acquired output voltage is greater than or equal to the predetermined threshold, the protection circuit resets the timer so that the timer outputs a low voltage level, and the light-emitting element does not work; when the voltage value converted from the current value or the voltage value of the acquired output voltage is less than the predetermined threshold, both of the timer and the light-emitting element work normally.

Referring to FIG. 5, FIG. 7 and the above examples, in an example of the present disclosure, the light-emitting element may be the LED illustrated in FIG. 5 and FIG. 7, and by acquiring the working current or output voltage of the LED, the working state of the LED is controlled, so as to avoid the working current flowing through the LED or the voltage on the LED to be too large, thereby preventing the LED from being burned out.

In the example of the present disclosure, the protection circuit acquires a working current or an output voltage of the protected object, and if the working current of the protected object is acquired, the current value of the working current is converted into a voltage value. The voltage value converted from the current value or the voltage value of the acquired output voltage is compared with a predetermined threshold. When the voltage value converted from the current value or the voltage value of the acquired output voltage is greater than or equal to the predetermined threshold, the protection circuit resets the timer so that the timer outputs a low voltage level; when the voltage value converted from the current value or the voltage value of the acquired output voltage is less than the predetermined threshold, the timer works normally. The protection circuit in the present disclosure can be used to reset the timer to cause the timer output a low level signal, so as to avoid the working current or the output voltage of the protected object to be further increased, which not only reduces the loss of the protected object and increases the service life of the protected object, but also effectively improves the stability and reliability of the system in which the protected object is located.

The present disclosure has been made in order to provide a timer based protection circuit.

According to one aspect of the present disclosure, a timer based protection circuit is provided. The timer based protection circuit is configured to: acquire a working current or an output voltage of a protected object; and compare a voltage value converted from a current value of the working current or a voltage value of the acquired output voltage with a predetermined threshold, wherein when the voltage value converted from the current value of the working current or the voltage value of the acquired output voltage is greater than or equal to the predetermined threshold, the protection circuit resets the timer to cause the timer to output a low voltage level, and when the voltage value converted from the current value of the working current or the voltage value of the acquired output voltage is less than the predetermined threshold, the timer works normally.

Optionally, the protection circuit includes a detection unit, a threshold comparison and driver unit, and a switch unit, wherein the detection unit is connected to the protected object, and the detection unit is configured to: acquire the working current or the output voltage of the protected object, and feed the voltage value converted from the current value of the working current or the voltage value of the acquired output voltage back to the threshold comparison and driver unit;

the threshold comparison and driver unit is connected to the detection unit and the switch unit, respectively, and the threshold comparison and driver unit is configured to: receive the voltage value converted from the current value of the working current or the voltage value of the acquired output voltage which is fed back by the detection unit, compare the received voltage value converted from the current value of the working current or the received voltage value of the acquired output voltage with the predetermined threshold, and control the switch unit to be switched on or off according to a comparison result; and the switch unit is connected with the timer, and the timer is configured to be reset by the switch unit when the switch unit is switched on and to work normally when the switch unit is switched off.

Optionally, when the protection circuit is configured to acquire the working current of the protected object, the detection unit is a current detection unit, the current detection unit is connected to the protected object, and the current detection unit is configured to: acquire the working current of the protected object, convert the current value of the acquired working current into a voltage value, and feed the voltage value converted from the current value back to the threshold comparison and driver unit; and the threshold comparison and driver unit is connected to the current detection unit and the switch unit, respectively, and the threshold comparison and driver unit is configured to: receive the voltage value which is converted from the current value and is fed back by the current detection unit, compare the received voltage value converted from the current value with the predetermined threshold, and control the switch unit to be switched on or off according to the comparison result.

Optionally, the current detection unit includes a feedback element, the feedback element is connected to the protected object, and the feedback element is configured to: acquire the working current of the protected object, convert the current value of the acquired working current into the voltage value, and feed the voltage value converted from the current value back to the threshold comparison and driver unit.

Optionally, the feedback element includes at least one selected from the group consisting of: a detection resistor, a transformer, and a Hall sensor.

Optionally, when the protection circuit is configured to acquire the output voltage of the protected object, the detection unit is a voltage detection unit, the voltage detection unit is connected to the protected object, and the voltage detection unit is configured to: acquire the output voltage of the protected object, and feed the voltage value of the acquired output voltage back to the threshold comparison and driver unit; and the threshold comparison and driver unit is connected to the voltage detection unit and the switch unit, respectively, and the threshold comparison and driver unit is configured to: receive the output voltage of the protected object which is fed back by the voltage detection unit, compare the received voltage value of the output voltage of the protected object with the predetermined threshold, and control the switch unit to be switched on or off according to the comparison result.

Optionally, the voltage detection unit includes a voltage dividing element, the voltage dividing element is connected to the protected object, and the voltage dividing element is configured to: acquire the output voltage of the protected object, perform a voltage division to the acquired output voltage, and feed a voltage value obtained by the voltage division of the output voltage back to the threshold comparison and driver unit.

Optionally, the voltage dividing element includes a first voltage dividing resistor and a second voltage dividing resistor, one end of the first voltage dividing resistor is connected to the protected object, the other end of the first voltage dividing resistor is connected to the second voltage dividing resistor, and an end of the second voltage dividing resistor that is not connected to the first voltage dividing resistor is connected to a grounding terminal.

Optionally, the threshold comparison and driver unit includes a comparison module and a driver module, wherein the comparison module is configured to: receive the voltage value which is converted from the current value and is fed back by the feedback element or receive the voltage value which is obtained by the voltage division of the output voltage and is fed back by the voltage dividing element, compare the received voltage value converted from the current value or the received voltage value obtained by the voltage division of the output voltage with the predetermined threshold, and output the comparison result; and the driver module is configured to: transmit the comparison result output by the comparison module to the switch unit, and control the switch unit to be switched on or off.

Optionally, the comparison module includes a comparator; a positive terminal of the comparator is connected to an end of the feedback element to which the protected object is connected or the positive terminal of the comparator is connected to an end of the first voltage dividing resistor to which the second voltage dividing resistor is connected, so as to receive the voltage value which is converted from the current value and is fed back by the feedback element or receive the voltage value obtained by the voltage division of the output voltage by the voltage dividing element; and a negative terminal of the comparator is configured to be input with the predetermined threshold, so as to compare the received voltage value converted from the current value or the received voltage value obtained by the voltage division of the output voltage with the predetermined threshold.

Optionally, the driver module includes a first resistor, one end of the first resistor is connected to an output end of the comparator, and the other end of the first resistor is connected to the switch unit.

Optionally, the switch unit includes:

a triode, a base of the triode is connected to the first resistor of the driver module, a collector of the triode is connected to a reset pin of the timer, and an emitter of the triode is connected to the grounding terminal.

Optionally, the protected object includes at least one of a controlled object and a load.

Optionally, the controlled object includes an external power switch.

Optionally, the timer includes: a 555 timer chip.

According to the other aspect of the present disclosure, a lighting device is provided. The lighting device includes a load and a timer based protection circuit, wherein the load includes a light-emitting element, and the protection circuit is configured to: acquire the working current or the output voltage of the light-emitting element; and compare the voltage value converted from the current value of the working current or the voltage value of the acquired output voltage with the predetermined threshold, wherein when the voltage value converted from the current value of the working current or the voltage value of the acquired output voltage is greater than or equal to the predetermined threshold, the protection circuit resets the timer to cause the timer to output a low voltage level so that the light-emitting element does not work, and when the voltage value converted from the current value of the working current or the voltage value of the acquired output voltage is less than the predetermined threshold, both of the timer and the light-emitting element work normally.

The present disclosure provides a method of utilizing a timer based protection circuit. The method may include acquiring a working current or an output voltage of a protected object; comparing a voltage value converted from a current value of the working current or a voltage value of the acquired output voltage with a predetermined threshold; and when the voltage value converted from the current value of the working current or the voltage value of the acquired output voltage is greater than or equal to the predetermined threshold, resetting, by the protection circuit, the timer to cause the timer to output a low voltage level; and when the voltage value converted from the current value of the working current or the voltage value of the acquired output voltage is less than the predetermined threshold, keeping the timer to work normally.

The method may further include connecting a detection unit of the protection circuit to the protected object, where the detection unit is configured to: acquire the working current or the output voltage of the protected object, and feed the voltage value converted from the current value of the working current or the voltage value of the acquired output voltage back to the threshold comparison and driver unit.

The method may also include connecting the threshold comparison and driver unit of the protection circuit to the detection unit and a switch unit of the protection circuit, where the threshold comparison and driver unit is configured to: receive the voltage value converted from the current value of the working current or the voltage value of the acquired output voltage which is fed back by the detection unit, compare the received voltage value converted from the current value of the working current or the received voltage value of the acquired output voltage with the predetermined threshold, and control the switch unit to be switched on or off according to a comparison result.

Additionally, the method may include connecting the switch unit with the timer, where the timer is configured to be reset by the switch unit when the switch unit is switched on and to work normally when the switch unit is switched off.

In the example of the present disclosure, the protection circuit acquires a working current or an output voltage of the protected object, and if the working current of the protected object is acquired, the current value of the working current is converted into a voltage value. The voltage value converted from the current value or the voltage value of the acquired output voltage is compared with a predetermined threshold. When the voltage value converted from the current value or the voltage value of the acquired output voltage is greater than or equal to the predetermined threshold, the protection circuit resets the timer so that the timer outputs a low voltage level; when the voltage value converted from the current value or the voltage value of the acquired output voltage is less than the predetermined threshold, the timer works normally. The protection circuit in the present disclosure can be used to reset the timer to cause the timer output a low level signal, so as to avoid the working current or the output voltage of the protected object to be further increased, which not only reduces the loss of the protected object and increases the service life of the protected object, but also effectively improves the stability and reliability of the system in which the protected object is located.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Heretofore, those skilled in the art will recognize that, although various examples of the present disclosure have been illustrated and described in detail herein, many other variations or modifications consistent with the principles of the present disclosure can be directly determined or deduced according to the content of the present disclosure without departing from the spirit and scope of the present disclosure. Therefore, the scope of the present disclosure should be understood and determined to cover all such other variations or modifications.

What is claimed is:

1. A timer based protection circuit, configured to:
   acquire a working current or an output voltage of a protected object; and
   compare a voltage value converted from a current value of the working current or a voltage value of the acquired output voltage with a predetermined threshold, wherein:
   when the voltage value converted from the current value of the working current or the voltage value of the acquired output voltage is greater than or equal to the predetermined threshold, the protection circuit resets the timer to cause the timer to output a low voltage level, and
   when the voltage value converted from the current value of the working current or the voltage value of the acquired output voltage is less than the predetermined threshold, the timer works normally, wherein the protection circuit comprises a comparator with a positive and negative terminal, wherein the positive terminal is connected to an end of a feedback element or an end of a first voltage dividing resistor to which a second voltage diving resistor is connected, so as to receive a voltage value which is converted from the current value and is fed back by the feedback element or receive the voltage value obtained by a voltage division of the output voltage by the first and second voltage dividing resistors, wherein the negative terminal is configured to be an input with a predetermined threshold, so as to compare the received voltage value converted from the current value or the received voltage value obtained by the voltage division of the output voltage with the predetermined threshold.

2. The timer based protection circuit according to claim 1, wherein the protection circuit comprises a detection unit, a threshold comparison and driver unit, and a switch unit, wherein:
   the detection unit is connected to the protected object, and the detection unit is configured to: acquire the working current or the output voltage of the protected object, and feed the voltage value converted from the current value of the working current or the voltage value of the acquired output voltage back to the threshold comparison and driver unit;
   the threshold comparison and driver unit is connected to the detection unit and the switch unit, and the threshold comparison and driver unit is configured to: receive the voltage value converted from the current value of the working current or the voltage value of the acquired output voltage which is fed back by the detection unit, compare the received voltage value converted from the current value of the working current or the received voltage value of the acquired output voltage with the predetermined threshold, and control the switch unit to be switched on or off according to a comparison result; and
   the switch unit is connected with the timer, and the timer is configured to be reset by the switch unit when the switch unit is switched on and to work normally when the switch unit is switched off.

3. The timer based protection circuit according to claim 2, wherein, when the protection circuit is configured to acquire the working current of the protected object, the detection unit is a current detection unit, the current detection unit is connected to the protected object, the current detection unit is configured to: acquire the working current of the protected object, convert the current value of the acquired working current into a voltage value, and feed the voltage value converted from the current value back to the threshold comparison and driver unit; and the threshold comparison and driver unit is connected to the current detection unit and the switch unit, and the threshold comparison and driver unit is configured to: receive the voltage value which is converted from the current value and is fed back by the current detection unit, compare the received voltage value converted from the current value with the predetermined threshold, and control the switch unit to be switched on or off according to the comparison result.

4. The timer based protection circuit according to claim 3, wherein:

the current detection unit comprises the feedback element, the feedback element is connected to the protected object, and the feedback element is configured to: acquire the working current of the protected object, convert the current value of the acquired working current into the voltage value, and feed the voltage value converted from the current value back to the threshold comparison and driver unit.

5. The timer based protection circuit according to claim 4, wherein the feedback element comprises at least one component selected from the group consisting of: a detection resistor, a transformer, and a Hall sensor.

6. The timer based protection circuit according to claim 4, wherein, when the protection circuit is configured to acquire the output voltage of the protected object, the detection unit is a voltage detection unit, the voltage detection unit is connected to the protected object, and the voltage detection unit is configured to: acquire the output voltage of the protected object, and feed the voltage value of the acquired output voltage back to the threshold comparison and driver unit; and the threshold comparison and driver unit is connected to the voltage detection unit and the switch unit, and the threshold comparison and driver unit is configured to: receive the output voltage of the protected object which is fed back by the voltage detection unit, compare the received voltage value of the output voltage of the protected object with the predetermined threshold, and control the switch unit to be switched on or off according to the comparison result.

7. The timer based protection circuit according to claim 6, wherein:

the voltage detection unit comprises a voltage dividing element, the voltage dividing element is connected to the protected object, and the voltage dividing element is configured to:

acquire the output voltage of the protected object, perform the voltage division to the acquired output voltage, and feed a voltage value obtained by the voltage division of the output voltage back to the threshold comparison and driver unit.

8. The timer based protection circuit according to claim 7, wherein the voltage dividing element comprises the first voltage dividing resistor and the second voltage dividing resistor, one end of the first voltage dividing resistor is connected to the protected object, another end of the first voltage dividing resistor is connected to the second voltage dividing resistor, and an end of the second voltage dividing resistor that is not connected to the first voltage dividing resistor is connected to a grounding terminal.

9. The timer based protection circuit according to claim 8, wherein the threshold comparison and driver unit comprises a comparison module and a driver module, wherein:

the comparison module is configured to: receive the voltage value which is converted from the current value and is fed back by the feedback element or receive the voltage value which is obtained by the voltage division of the output voltage and is fed back by the voltage dividing element, compare the received voltage value converted from the current value or the received voltage value obtained by the voltage division of the output voltage with the predetermined threshold, and output the comparison result; and the driver module is configured to: transmit the comparison result output by the comparison module to the switch unit, and control the switch unit to be switched on or off.

10. The timer based protection circuit according to claim 9, wherein:

the driver module comprises a first resistor, wherein one end of the first resistor is connected to an output end of the comparator, and the other end of the first resistor is connected to the switch unit.

11. The timer based protection circuit according to claim 10, wherein the switch unit comprises:

a triode, a base of the triode is connected to the first resistor of the driver module, a collector of the triode is connected to a reset pin of the timer, and an emitter of the triode is connected to the grounding terminal.

12. The timer based protection circuit according to claim 1, wherein the protected object comprises at least one of a controlled object and a load.

13. The timer based protection circuit according to claim 12, wherein the controlled object comprises an external power switch.

14. The timer based protection circuit according to claim 1, wherein the timer comprises: a 555 timer chip.

15. A lighting device, comprising a load and a timer based protection circuit, wherein the load comprises a light-emitting element, and timer based protection circuit is configured to:

acquire a working current or an output voltage of a protected object; and compare a voltage value converted from a current value of the working current or a voltage value of the acquired output voltage with a predetermined threshold, wherein:

when the voltage value converted from the current value of the working current or the voltage value of the acquired output voltage is greater than or equal to the predetermined threshold, the protection circuit resets the timer to cause the timer to output a low voltage level, and when the voltage value converted from the current value of the working current or the voltage value of the acquired output voltage is less than the predetermined threshold, the timer works normally, wherein the protection circuit comprises a comparator with a positive and negative terminal, wherein the positive terminal is connected to an end of a feedback element or an end of a first voltage dividing resistor to which a second voltage diving resistor is connected, so as to receive a voltage value which is converted from the current value and is fed back by the feedback element or receive the voltage value obtained by a voltage division of the output voltage by the first and second voltage dividing resistors, wherein the negative terminal is configured to be an input with a predetermined threshold, so as to compare the received voltage value converted from the current value or the received voltage value obtained by the voltage division of the output voltage with the predetermined threshold.

16. A method of utilizing a timer based protection circuit, comprising:

acquiring a working current or an output voltage of a protected object;

comparing a voltage value converted from a current value of the working current or a voltage value of the acquired output voltage with a predetermined threshold; when the voltage value converted from the current value of the working current or the voltage value of the acquired output voltage is greater than or equal to the predetermined threshold, resetting, by the protection circuit, the timer to cause the timer to output a low voltage level; and when the voltage value converted from the current value of the working current or the voltage value of the acquired output voltage is less than the predetermined threshold, keeping the timer to work normally, wherein the protection circuit comprises a comparator with a positive and negative terminal, wherein the positive terminal is connected to an end of a feedback element or an end of a first voltage dividing resistor to which a second voltage diving resistor is connected, so as to receive a voltage value which is converted from the current value and is fed back by the feedback element or receive the voltage value obtained by a voltage division of the output voltage by the first and second voltage dividing resistors, wherein the negative terminal is configured to be an input with a predetermined threshold, so as to compare the received voltage value converted from the current value or the received voltage value obtained by the voltage division of the output voltage with the predetermined threshold.

17. The method according to claim 16, further comprising:

connecting a detection unit of the protection circuit to the protected object, wherein the detection unit is configured to: acquire the working current or the output voltage of the protected object, and feed the voltage value converted from the current value of the working current or the voltage value of the acquired output voltage back to the threshold comparison and driver unit;

connecting the threshold comparison and driver unit of the protection circuit to the detection unit and a switch unit of the protection circuit, wherein the threshold comparison and driver unit is configured to: receive the voltage value converted from the current value of the working current or the voltage value of the acquired output voltage which is fed back by the detection unit, compare the received voltage value converted from the current value of the working current or the received voltage value of the acquired output voltage with the predetermined threshold, and control the switch unit to be switched on or off according to a comparison result; and connecting the switch unit with the timer, wherein the timer is configured to be reset by the switch unit when the switch unit is switched on and to work normally when the switch unit is switched off.

* * * * *